(12) United States Patent
Fischer et al.

(10) Patent No.: US 8,707,415 B2
(45) Date of Patent: *Apr. 22, 2014

(54) METHOD FOR STORING DATA, COMPUTER PROGRAM PRODUCT, ID TOKEN AND COMPUTER SYSTEM

(75) Inventors: Jörg Fischer, Berlin (DE); Frank Dietrich, Berlin (DE); Manfred Paeschke, Wandlitz (DE)

(73) Assignee: Bundesdruckeri GmbH, Berlin (DE)

( * ) Notice: Subject to any disclaimer, the term of this patent is extended or adjusted under 35 U.S.C. 154(b) by 100 days.

This patent is subject to a terminal disclaimer.

(21) Appl. No.: 13/059,500

(22) PCT Filed: Sep. 4, 2009

(86) PCT No.: PCT/EP2009/061471
§ 371 (c)(1),
(2), (4) Date: Apr. 12, 2011

(87) PCT Pub. No.: WO2010/031698
PCT Pub. Date: Mar. 25, 2010

(65) Prior Publication Data
US 2011/0191829 A1 Aug. 4, 2011

(30) Foreign Application Priority Data

Sep. 22, 2008 (DE) .......................... 10 2008 042 262
Oct. 2, 2008 (DE) .......................... 10 2008 042 582

(51) Int. Cl.
*H04L 9/32* (2006.01)
*G06F 21/34* (2013.01)

(52) U.S. Cl.
CPC ..................................... *G06F 21/34* (2013.01)
USPC ............ 726/9; 726/4; 726/5; 726/20; 726/28; 713/168; 713/182; 713/185; 713/169; 713/171; 705/44; 705/51; 705/65; 705/66; 705/67; 380/247; 380/255; 380/283; 455/410; 455/420; 709/219; 709/225

(58) Field of Classification Search
CPC ..................... H04L 29/06551; H04L 63/0853; H04L 9/00; G06F 21/34
USPC .............. 726/4, 1, 3, 9, 20, 28; 713/168, 169, 713/182

See application file for complete search history.

(56) References Cited

U.S. PATENT DOCUMENTS 5,825,875 A * 10/1998 Ugon .............................. 705/65
(Continued)

FOREIGN PATENT DOCUMENTS

DE 102008000067 A1 7/2009
(Continued)

OTHER PUBLICATIONS

Suk-Hyun Seo et al., Smart Vehicle Management System by using Gateway, Hand-set and VMP, International Conference on Control, Automatic and Systems 1509-1513 (Oct. 17-20, 2007).*

(Continued)

*Primary Examiner* — Morshed Mehedi
*Assistant Examiner* — Sharon Lynch
(74) *Attorney, Agent, or Firm* — Matthew B. Dernier, Esq.; Gibson & Dernier LLP

(57) ABSTRACT

A method includes: establishing a first connection between a first ID token and a first computer system via a second computer system for reading at least one first attribute from the first ID token, establishing a second connection between a second ID token and the first computer system via the second computer system for reading at least one second attribute from the second ID token, sending the first and second attributes from the first computer system to a third computer system, receiving the data from the third computer system by the first computer system, writing the data into the second ID token via the second connection by the first computer system thereby storing the data in the second ID token, where the first connection still exists, wherein the first and the second connection are respectively connection with end-to-end encryption and a connection oriented protocol.

16 Claims, 9 Drawing Sheets

(56) References Cited

U.S. PATENT DOCUMENTS

| | | | |
|---|---|---|---|
| 5,918,228 A * | 6/1999 | Rich et al. ............................. 1/1 |
| 6,173,400 B1 * | 1/2001 | Perlman et al. ............... 713/172 |
| 6,442,532 B1 * | 8/2002 | Kawan ........................ 705/36 R |
| 7,178,025 B2 * | 2/2007 | Scheidt et al. ................ 713/168 |
| 7,290,288 B2 * | 10/2007 | Gregg et al. .................... 726/28 |
| 7,475,250 B2 | 1/2009 | Aull |
| 7,876,201 B2 * | 1/2011 | Bauchot et al. ............ 340/426.1 |
| 8,387,108 B1 * | 2/2013 | Satish et al. ....................... 726/1 |
| 2001/0027527 A1 * | 10/2001 | Khidekel et al. .............. 713/201 |
| 2001/0045451 A1 * | 11/2001 | Tan et al. ...................... 235/375 |
| 2002/0097159 A1 * | 7/2002 | Hooglander ............... 340/573.1 |
| 2003/0023858 A1 | 1/2003 | Banerjee |
| 2003/0115468 A1 | 6/2003 | Aull |
| 2004/0034774 A1 * | 2/2004 | Le Saint ........................ 713/169 |
| 2004/0128383 A1 * | 7/2004 | Hinton .......................... 709/225 |
| 2004/0128390 A1 * | 7/2004 | Blakley et al. ................ 709/228 |
| 2004/0139028 A1 * | 7/2004 | Fishman et al. ................ 705/67 |
| 2004/0185842 A1 * | 9/2004 | Spaur et al. ................... 455/420 |
| 2004/0210757 A1 * | 10/2004 | Kogan et al. .................. 713/182 |
| 2005/0071282 A1 | 3/2005 | Lu |
| 2005/0105731 A1 * | 5/2005 | Basquin ........................ 380/247 |
| 2005/0138421 A1 * | 6/2005 | Fedronic et al. .............. 713/201 |
| 2005/0235148 A1 * | 10/2005 | Scheidt et al. ................ 713/168 |
| 2007/0008084 A1 * | 1/2007 | Wu et al. .................... 340/425.5 |
| 2007/0132548 A1 * | 6/2007 | Baraz et al. .................... 340/5.6 |
| 2007/0283424 A1 * | 12/2007 | Kinser et al. ....................... 726/5 |
| 2007/0294431 A1 | 12/2007 | Adelman |
| 2008/0005566 A1 * | 1/2008 | Morita .......................... 713/171 |
| 2008/0083827 A1 | 4/2008 | Ho |
| 2008/0120712 A1 | 5/2008 | Ayers |
| 2008/0184339 A1 * | 7/2008 | Shewchuk et al. ................ 726/3 |
| 2008/0229402 A1 * | 9/2008 | Smetters et al. ................... 726/9 |
| 2008/0229411 A1 * | 9/2008 | Norman et al. ................. 726/20 |
| 2008/0307515 A1 | 12/2008 | Drokov |
| 2009/0198618 A1 * | 8/2009 | Chan et al. ...................... 705/66 |
| 2009/0292927 A1 * | 11/2009 | Wenzel et al. ................ 713/185 |
| 2010/0064136 A1 * | 3/2010 | Longobardi et al. .......... 713/168 |
| 2011/0023103 A1 * | 1/2011 | Dietrich et al. .................... 726/9 |
| 2011/0264916 A1 * | 10/2011 | Fischer et al. ................. 713/175 |
| 2011/0296512 A1 * | 12/2011 | Dietrich et al. .................... 726/9 |
| 2012/0023559 A1 * | 1/2012 | Dietrich et al. .................... 726/6 |
| 2012/0167186 A1 * | 6/2012 | Dietrich ............................ 726/6 |
| 2012/0174193 A1 * | 7/2012 | Dietrich ............................ 726/4 |

FOREIGN PATENT DOCUMENTS

| | | |
|---|---|---|
| EP | 1239400 A1 | 9/2002 |
| EP | 1322086 A2 | 6/2003 |
| EP | 1802155 A1 | 6/2007 |

OTHER PUBLICATIONS

German Office Action for corresponding patent DE 102008042262.2-31, dated May 28, 2009.

International Search Report for corresponding application PCT/EP2009/061471, dated Apr. 16, 2010.

International Preliminary Report on Patentability and Written Opinion for corresponding application PCT/EP2009/061471, Mar. 22, 2011.

* cited by examiner

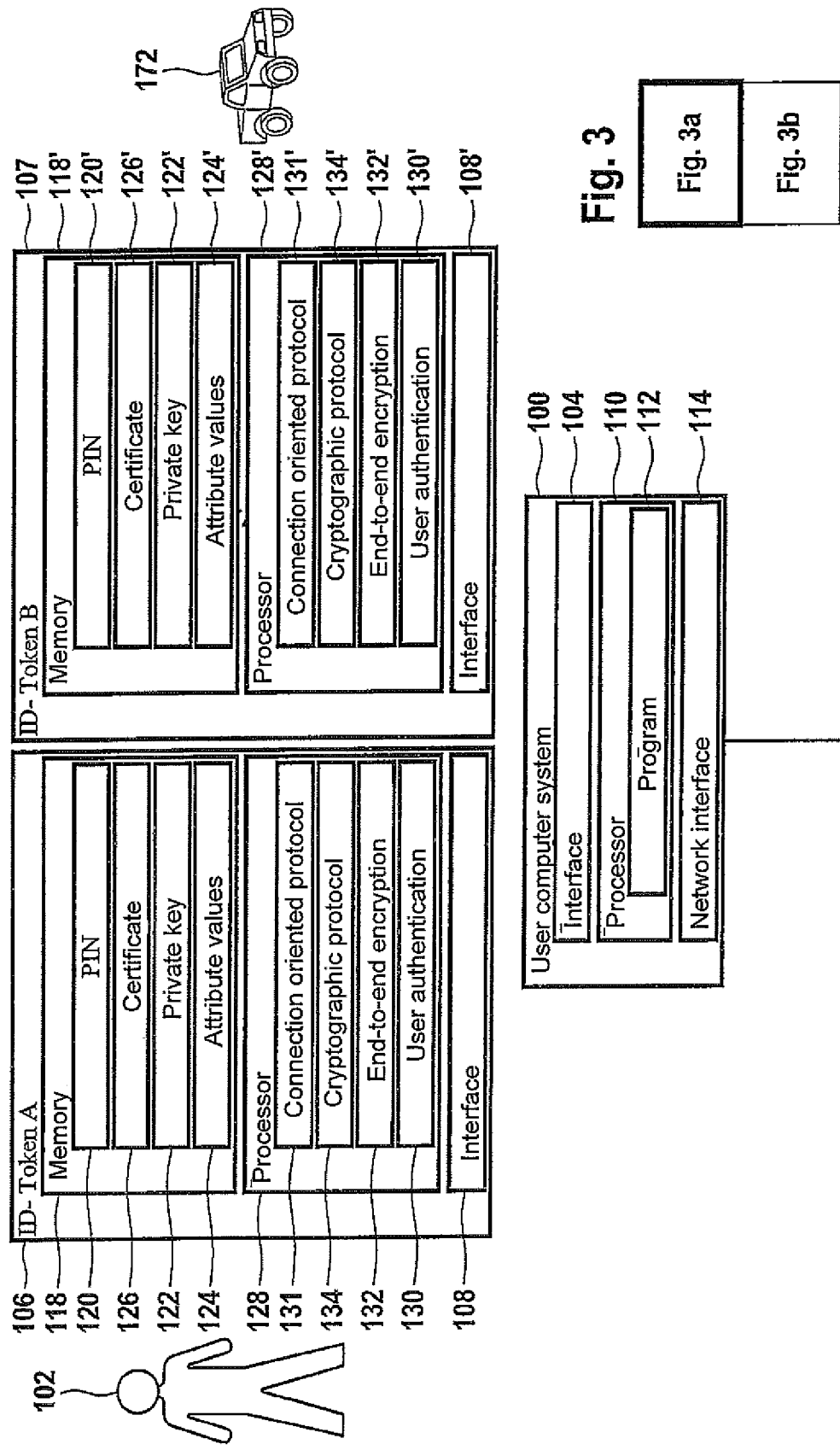

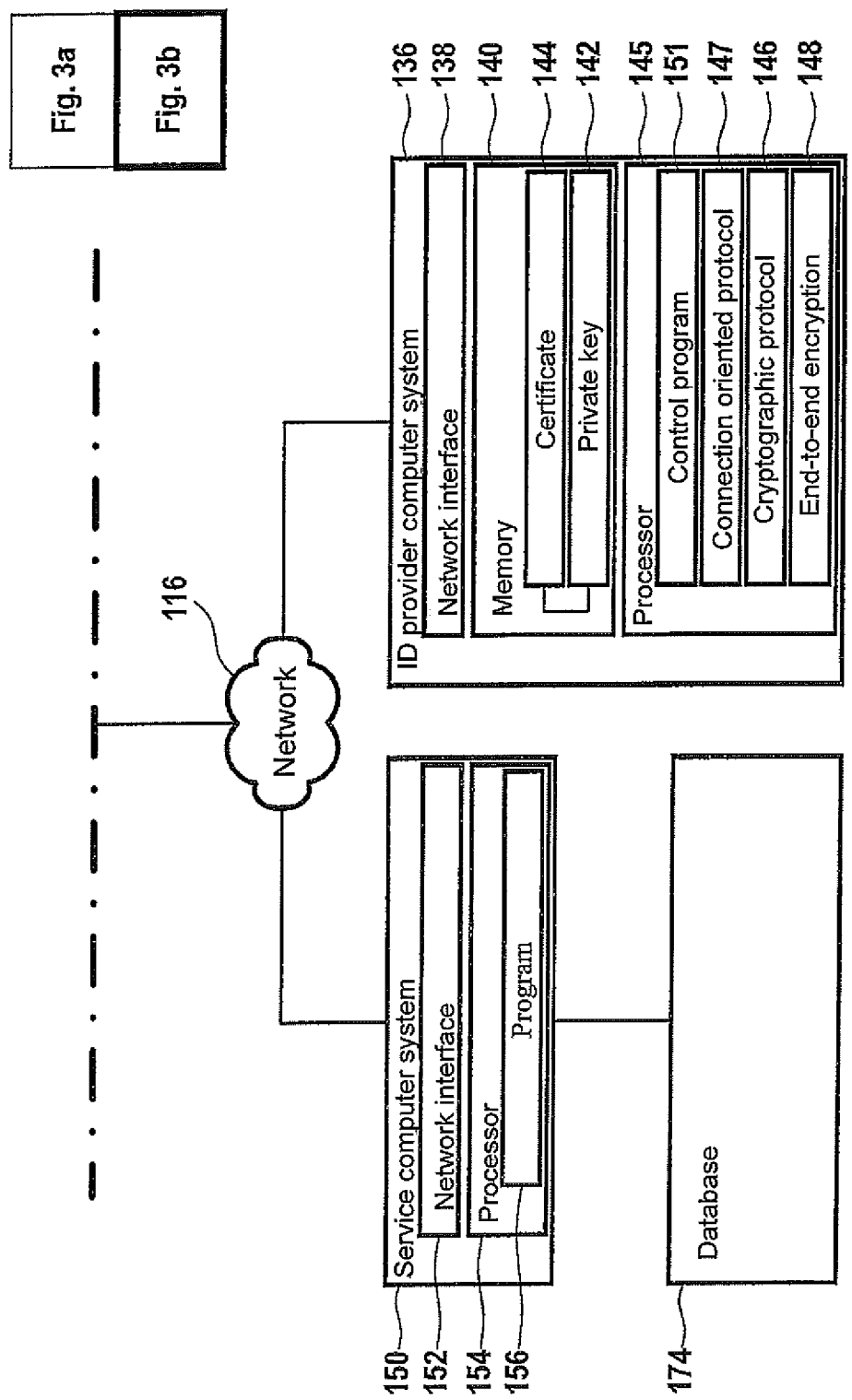

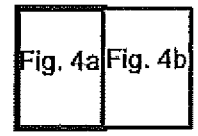
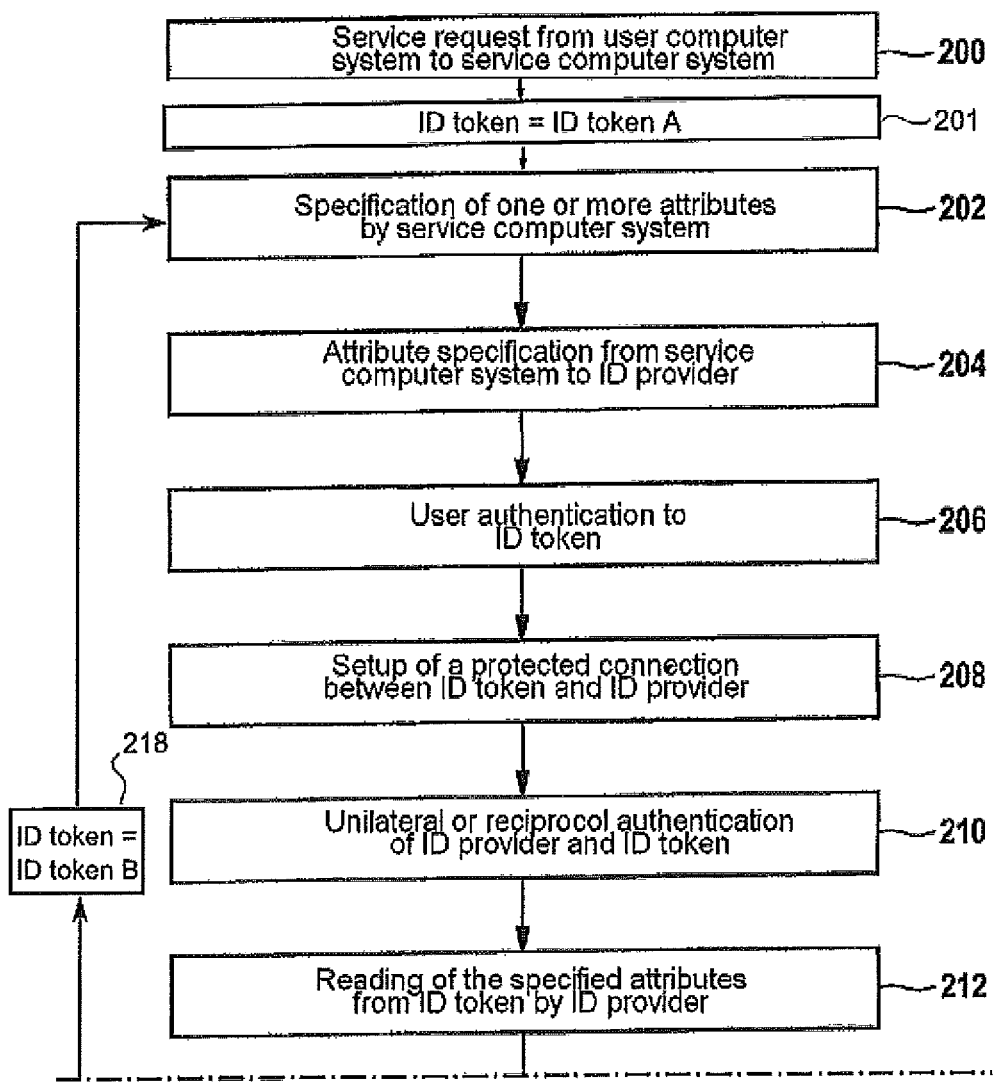
Fig. 4

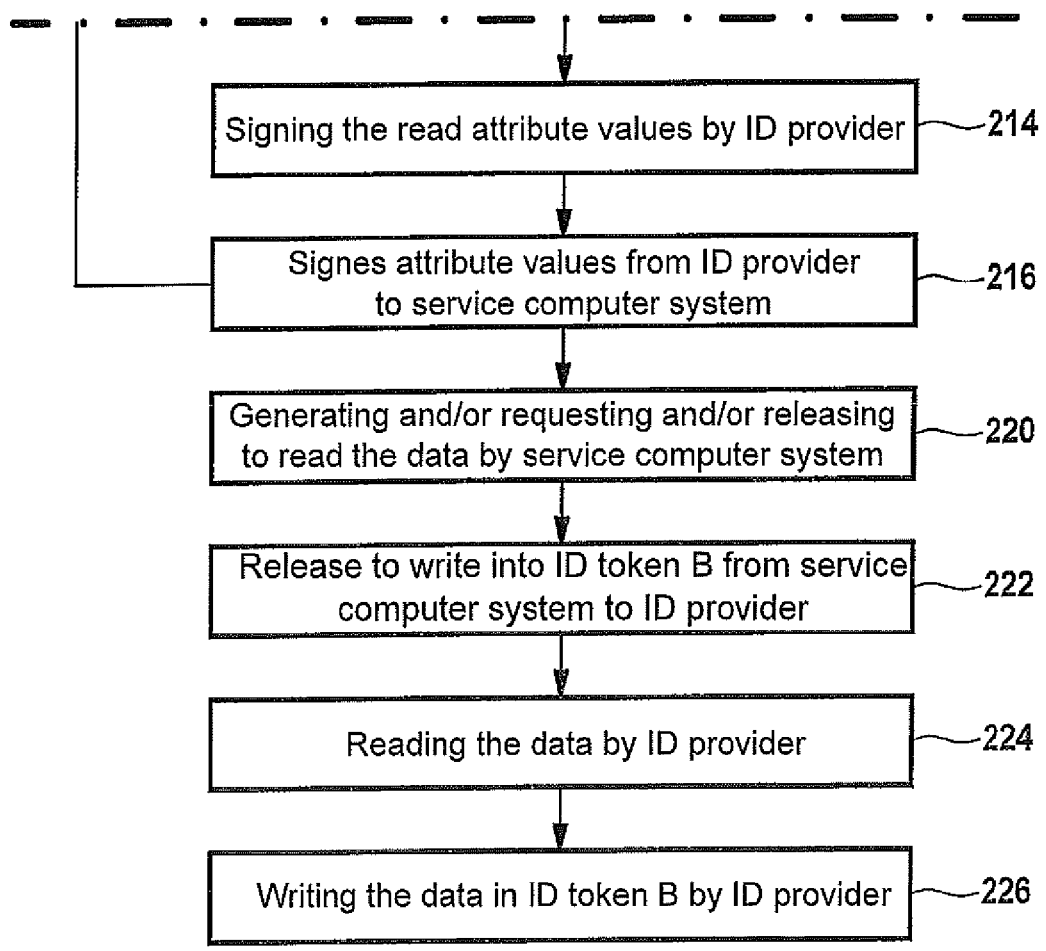

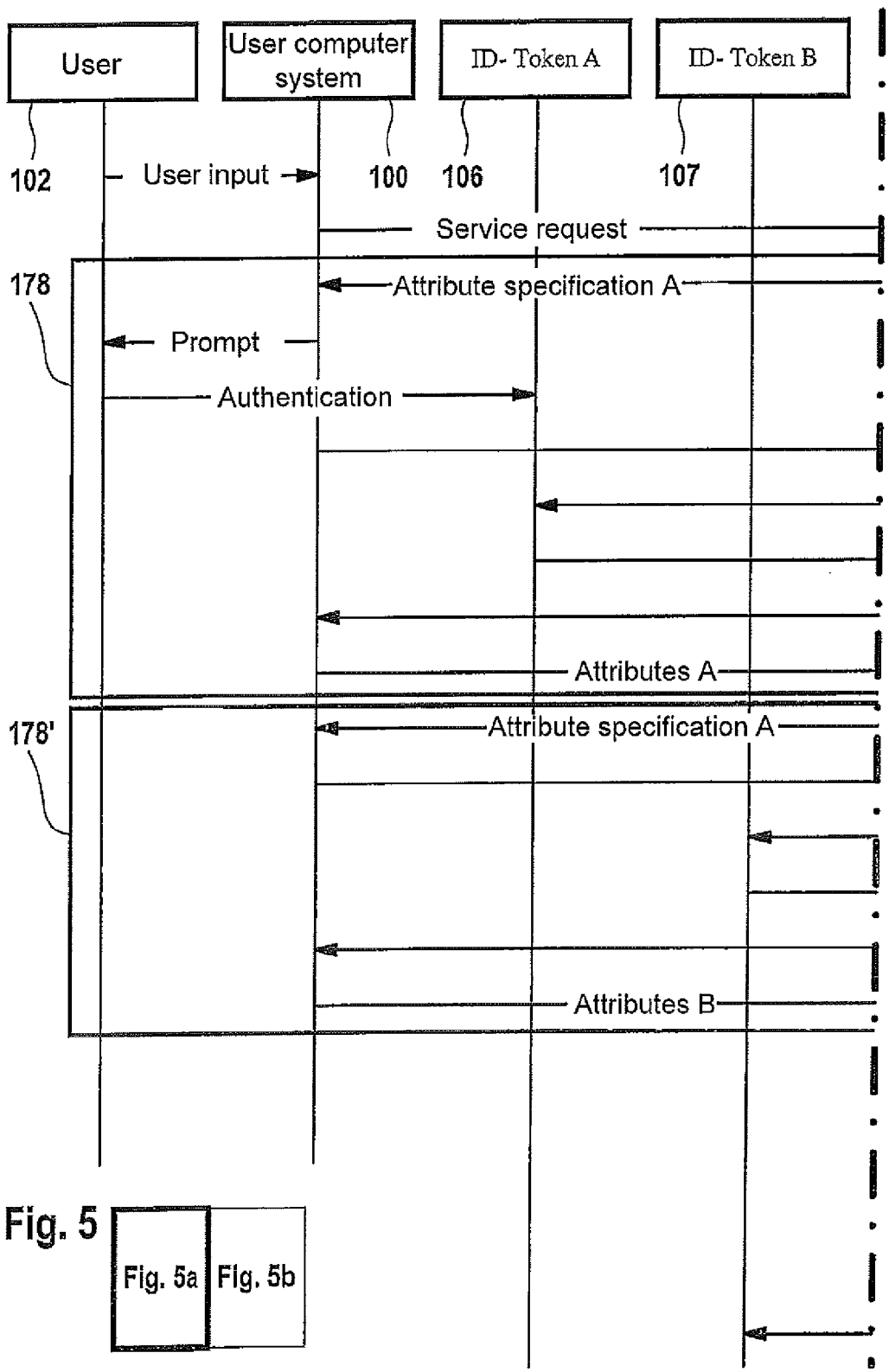

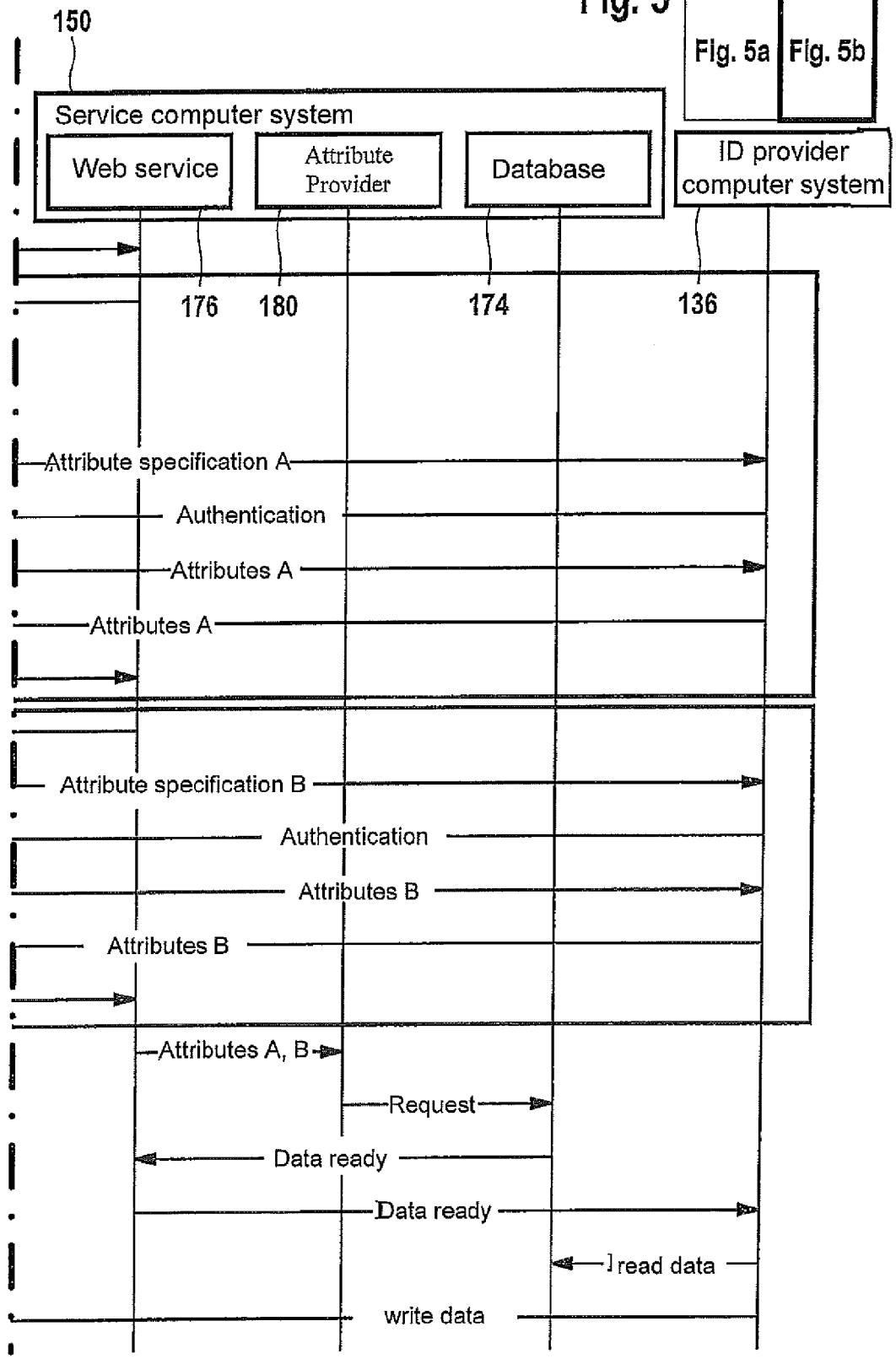

METHOD FOR STORING DATA, COMPUTER PROGRAM PRODUCT, ID TOKEN AND COMPUTER SYSTEM

BACKGROUND

The invention relates to a method for storing data, to a computer program product, to an ID token, in particular a document of value or a security document, and to a computer system.

The prior art discloses various methods for managing what is known as the digital identity of a user:

Microsoft Windows CardSpace is a client-based digital identity system which is intended to allow Internet users to communicate their digital identity to online services. One drawback in this context, inter alia, is that the user can manipulate his digital identity.

By contrast, OPENID is a server-based system. What is known as an identity server stores a database with the digital identities of the registered users. One drawback of this, inter alia, is inadequate data protection, since the digital identities of the users are stored centrally and the user behavior can be recorded.

US 2007/0294431 A1 discloses a further method for managing the digital identities which likewise requires user registration.

From the patent application DE 102008000067.1-31 of the same applicant a method for reading of at least one attribute stored in an ID token is known, wherein an authentication of the user as well as of a computer system to the ID token is required for allowing reading access to an attribute stored in ID token, such that this can be forwarded to a computer system for providing a service.

From US 2003/0023858 A1 a method for generating a data set is known, which shall serve as an electronic passport. The data set is downloaded by a user and stored on a mobile phone for example.

SUMMARY OF THE INVENTION

By contrast, the invention is based on the object of providing an improved method for storing data, and also an appropriate computer program product, an ID token and a computer system.

The objects on which the invention is based are respectively achieved by means of the features of one or more embodiments disclosed and/or described herein.

According to embodiments of the invention a method is provided for storing data. A first connection is established between a first ID token and a first computer system via a second computer system. The first computer system can be a server computer system, which is also denoted below as ID provider computer system, and which is connected to the second computer system via a network, e.g. the internet. The second computer system can be a personal computer (PC) of a user, which is also denoted below as user computer system. At least a first attribute is read from the first ID token via the first connection by the first computer system.

Further, a second connection is established between the second ID token and the first computer system via the second computer system in order to read at least a second attribute from the second ID token. For this the second computer system can receive a command from the first computer system indicating that a connection—a so-called multi session—shall be established to the first and the second ID token respectively. Thereby it is avoided that the second computer system disrupts the first connection after the first attributes has been read from the first ID token.

The first and second attributes are sent by the first computer system to a third computer system. The third computer system can be a server computer system, which is connected to the first and/or to the second computer system via the network. The third computer system can be a server computer system of a service provider, which is denoted below also as service computer system. Preferably the first and the second attributes are digitally signed by the first computer system before forwarding them to the third computer system, such that the third computer system can check the trustworthiness of the first and the second attributes.

Preferably the first attributes are forwarded from the first computer system to the third computer system directly after reading them from the first ID token, such that the first attribute does not need to be stored permanently by the first computer system. In contrast it suffices to store the first attribute in the first computer system only as long as it is required for forwarding the first attribute to the third computer system after it has been read from the first ID token. Preferably it is proceeded likewise for the second attribute, which is also forwarded directly after reading it from the second ID token to the third computer system by the first computer system. An eventually required temporary copy for the purpose of forwarding of the first attributes and of the second attributes respectively is deleted by the first computer system directly after sending. This is advantageous because the first computer system can be designed stateless and data in need for protection, which can comprise the first and the second attributes, is not gathered by the first computer system.

The third computer system uses the first and the second attributes received from the first computer system for determination of data. This can be performed by calculating the data from the first and the second attributes by the third computer system or by an access to a database with the aid of the first and the second attributes and querying the data from the database by the third computer system. The first computer system receives the data then from the third computer system, e.g. via the network. Preferably, data transmission from the third computer system to the first computer system is performed via a secure connection.

The first computer system then writes data into the second ID token via the second connection in order to store the data in the second ID token. It is a condition for this that also the first connection to the first ID token is still alive during the whole time period of writing. Thereby it is ensured that the user did not cancel his authorization for writing the first ID token on the part of the first computer system by having removed his first ID token from a reading device of the first computer system, which would disrupt the first connection. By performing writing via the second connection it is further ensured that the second connection is not disrupted in the meantime because the second ID token is replaced for example by a manipulated, i.e. fake or falsified ID token.

This is accounted for because the first and the second connections are established and kept up respectively with the aid of a connection oriented protocol. Such a connection related protocol registers when one of the two participants of the connection is removed. Thereby throughout the whole time period from establishing the first connection and establishing the second connection on until writing the data, the necessary condition can be checked that the first as well as the second connection are not disrupted until ending of the writing procedure. In case of disrupting the first or the second connection before ending of the writing procedure the data are not stored in the second ID token.

Embodiments of the invention are especially advantageous, because the invention makes it possible to write the second ID token with document individual data securely, wherein the first ID token serves as a an "anchor of trust". The owner of the first ID token is enabled to have his second ID token written with document individual data for the first time or to update such document individual data, in particular online without having to appear personally for example at a government agency.

For example, the first ID token is assigned to the authorized user, i.e. the owner of the ID token. For example the first ID token is an electronic passport. In contrast the second ID token can be assigned to a thing, e.g. a motor vehicle. For instance the second ID token is an electronic motor vehicle certificate of title or an electronic motor vehicle registration certificate. The invention allows updating the electronic motor vehicle certificate of title or the electronic motor vehicle registration certificate online, for example when the owner of the motor vehicle and/or the license number is changed.

In line with the invention, a "document" is understood to mean paper-based and/or plastic-based documents, such as identification documents, particularly passports, identification cards, visas and driver's licenses, vehicle registration certificates, vehicle registration documents, corporate identification cards, health cards or other ID documents and also chip cards, payment means, particularly bankers' cards and credit cards, waybills or other credentials, which incorporate a data memory for storing the at least one attribute.

According to an embodiment of the invention the connection oriented protocol of the first and/or the second connection is a packet-switching transport protocol for establishing an end-to-end connection in full duplex, e.g. the Transmission Control Protocol (TCP).

Embodiments of the invention are thus particularly advantageous, since the at least one attribute is read from a particularly trustworthy document, for example an official document. It is also of particular advantage that central storage of the attributes is not necessary. The invention thus allows a particularly high level of trustworthiness for the communication of the attributes associated with a digital identity, accompanied by optimum data protection with extremely convenient handling.

According to one embodiment of the invention, the first computer system has at least one certificate which is used for authenticating the first computer system to the first and/or the second ID token. The certificate contains an indication of those attributes for which the first computer system has read authorization. The respective ID token uses said certificate to check whether the first computer system has the necessary read authorization for read access to the first attribute and the second attribute respectively before such read access can be performed by the first computer system.

According to one embodiment of the invention, the first computer system sends the at least one first and respectively the second attribute read from the ID token directly to the third computer system. By way of example, the third computer system may be a server of a government agency, e.g. a registration agency for motor vehicles.

According to one embodiment of the invention, the attributes read from the ID token are transmitted from the first computer system to the second computer system of the user first of all. By way of example, the second computer system has an ordinary Internet browser which the user can use to open a web page on the third computer system. The user can input into the web page a request for a service like for example updating his electronic motor vehicle registration certificate.

The third computer system then specifies those attributes, for example of the user and/or of his first and/or second ID token, which it requires in order to provide the service or to take the order. The corresponding attribute specification, which contains the specification of these attributes, is then sent from the third computer system to the first computer system. This can be done with or without interposition of the second computer system. In the latter case, the user can specify the desired first computer system to the third computer system, for example by inputting the URL of the first computer system into a web page on the third computer system from the second computer system.

According to one embodiment of the invention, the service request from the user to the third computer system contains the indication of an identifier, wherein the identifier identifies the first computer system. By way of example, the identifier is a link, for example a URL on the first computer system.

According to one embodiment of the invention, the attribute specification is sent not directly from the third computer system to the first computer system but rather from the third computer system to the second computer system first of all.

According to one embodiment of the invention, the attributes read from the first and respectively the second ID token are signed by the first computer system and are then transmitted to the second computer system. The user of the second computer system can thus read the attributes but without being able to alter them. Only after release by the user are the attributes forwarded from the second computer system to the third computer system.

According to one embodiment of the invention, the user can add further data to the attributes before they are forwarded.

According to one embodiment of the invention, the first computer system has a plurality of certificates with different read rights. On the basis of the receipt of the attribute specification, the first computer system selects one or more of these certificates in order to read the relevant attributes from the ID tokens.

In a further aspect, the invention relates to a computer program product, particularly a digital storage medium, with executable program instructions for performing a method according to the invention.

In a further aspect, the invention relates to an ID token with a protected memory area for storing at least one attribute and for storing data, with means for authenticating a first computer system to the ID token, means for setting up a connection to the first computer system according to a connection oriented protocol, wherein the connection can be used by the first computer system to read the at least one attribute, wherein a necessary prerequisite for the reading of the at least one attribute from the ID token by the first computer system is the successful authentication of the first computer system to the ID token, and wherein the data can be written via the connection into the memory.

For example the ID token is an electronic motor vehicle certificate of registration, which is assigned to a motor vehicle but not to a user. An authentication can be omitted in this case.

In addition to the authentication of the first computer system to the ID token, as is known per se as "Extended Access Control", for example, for machine-readable travel documents (MRTDs) and is specified by the international aviation authority ICAO, it may be required depending on the embodiment that also the user has to authenticate himself to the ID token. By way of example, successful authentication of the user to the ID token unlocks the latter, so that the further steps, namely the authentication of the first computer system to the ID token and/or the setup of a protected connection for reading the attributes, can take place.

According to one embodiment of the invention, the ID token has means for end-to-end encryption. This allows the connection between the ID token and the first computer system to be set up via a third computer system of the user, since the user cannot make any changes to the data transmitted via the connection on account of the end-to-end encryption.

In a further aspect, the invention relates to a first computer system with a computer system having means for establishing a first connection between a first ID token and a first computer system via a second computer system for reading at least a first attribute from the first ID token, means for establishing a second connection between a second ID token and the first computer system via the second computer system for reading at least a second attribute from the second ID token, means for sending the first and the second attributes from the first computer system to a third computer system, means for receiving the data from the third computer system via the first computer system, means for writing the data of the first computer system via the second connection into the second ID token in order to store the data in the second ID token, wherein a condition for writing the data is that also the first connection still exists, wherein the first and the second connections are respectively connections with an end-to-end encryption and with a connection oriented protocol.

According to embodiments of the invention the first computer system has means for receiving an attribute specification via a network, wherein the attribute specification specifies at least one attribute, means for authenticating to an ID token, means for reading at least one attribute from the ID token via a protected connection, wherein a prerequisite for the reading of the at least one attribute is that a user associated with the ID token has authenticated himself to the ID token.

According to one embodiment of the invention, the first computer system may contain means for generating a request to the user. When the first computer system has received the attribute specification from the third computer system, for example, it then sends a request to the second computer system of the user, so that the user is asked to authenticate himself to the first and/or second ID token. When the authentication of the user to the first and/or second ID token has been performed successfully, the first computer system receives confirmation from the second computer system. The first computer system then authenticates itself to the respective ID token and the secure first connection respectively the second connection is set up between the ID token and the first computer system using end-to-end encryption.

According to one embodiment of the invention, the first computer system has a plurality of certificates which respectively specify different read rights and/or write rights. Following receipt of the attribute specification, the first computer system chooses at least one of said certificates with the read rights which are sufficient for reading the specified attributes. Further the first computer system chooses the certificate that specifies the rights required for writing data into the second ID token in order to prove its authorization to the second ID token.

Embodiments of the first computer system according to the invention are particularly advantageous, since they form a confidence anchor for the unfalsified digital identity of the user in combination with the need for authentication of the user to the ID token. A particular advantage in this context is that this does not require prior registration of the user with the first computer system or central storage of the attributes of the users which form the digital identities.

According one embodiment of the invention, the computer system is an officially certified trust center, particularly a trust center which is compliant with the signature act.

BRIEF DESCRIPTION OF THE DRAWINGS

Embodiments of the invention are explained in more detail below with reference to the drawings, in which:

FIG. 3 shows a block diagram of a further embodiment of computer systems and ID tokens according to the invention, FIG. 4 shows a flow diagram of a further embodiment of a method according to the invention, FIG. 5 shows a UML diagram of a further embodiment of a method according to the invention.

Elements of the embodiments below which correspond to one another are identified by the same reference symbols.

DETAILED DESCRIPTION OF THE INVENTION

Figure 1:
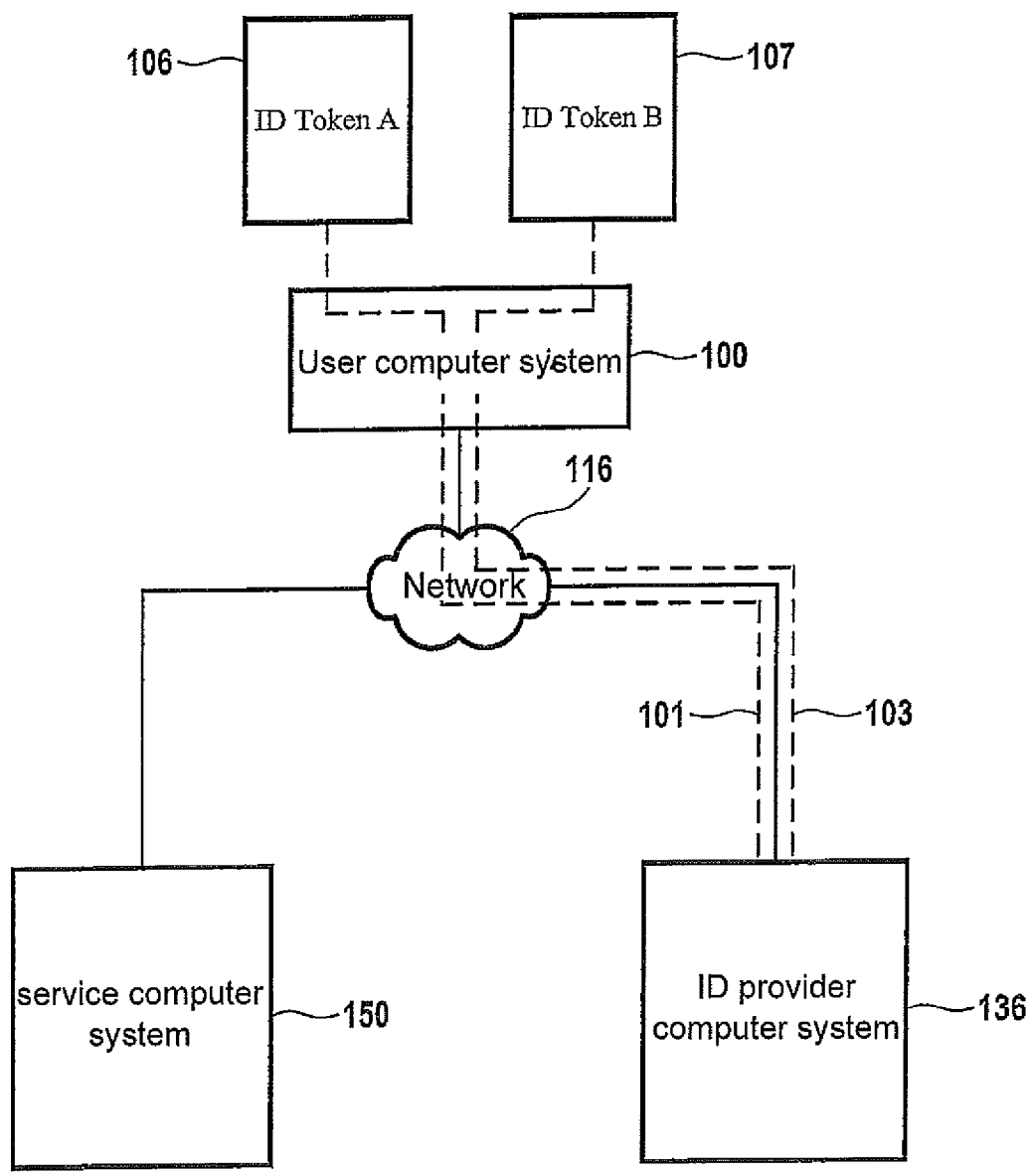
FIG. 1 shows a block diagram of an embodiment of computer systems and ID tokens according to the invention.

FIG. 1 shows a block diagram of an embodiment of a data processing system according to the invention. The data processing system has a user computer system 100. The user computer system 100 can be a PC, a portable computer, e.g. a laptop or palmtop computer, a Personal Digital Assistant (PDA), a mobile telecommunication device, in particular a smart phone, or the like.

The user computer system 100 serves for communication with the ID token A 106 and the ID token B 107. The communication between the ID tokens A and B on the one hand and the user computer system 100 on the other hand can be a contact connection or a contactless connection, in particular according to an RFID method. The ID token A can be an electronic identity card, i.e. an identity card that comprises an RFID chip where attributes of the user are stored.

In principal the ID token B can be composed similarly to ID token A, wherein the ID token B is not assigned to a user but to a thing, e.g. a motor vehicle. For example the ID token B is a motor vehicle certificate of title or a motor vehicle registration certificate, where attributes of the motor vehicle are stored.

A reading device (not depicted in FIG. 1) is connected to the user computer system 100 or integrated into the user computer system 100, such that the user computer system 100 can communicate with the ID tokens A and B. The reading device is such that a first connection A 101 between the ID token A and the user computer system 100 can be present at the same time as a second connection B 103 between the ID token B and the user computer system 100.

At least one attribute is stored in the ID token B, which allocates the ID token B to the thing, e.g. the motor vehicle. This attribute can be a so-called unique identifier of the thing, e.g. the motor vehicle identification number or the like.

The user computer system 100 is connected to the service computer system 150 via network 116, e.g. the internet. The service computer system 150 can be a server computer system of a government agency, e.g. the government agency for motor vehicle registrations.

Further the user computer system 100 is connected via the network 116 to the ID provider computer system 136. The ID provider computer system 136 serves for reading the attributes from the ID tokens A and B, for forwarding these attributes to the service computer system 150, for receiving data from the service computer system 150, and for reading access to the ID token B based on these data in order to update the ID token B. The data can for example be updated attribute values.

For example if the registration license number of a user's motor vehicle has to be changed due to a relocation of the user without a need for the user to go personally to the government agency.

A first connection A 101 is established between the ID token A and the ID provider computer system 136. The connection 101 is a connection with end-to-end encryption such that data exchanged over connection 101 can neither be decrypted by the user computer system 100 nor by other participants of the network 116. The connection 101 is established and maintained by using a connection oriented protocol.

An analogous approach is used for ID token B: A second connection B 103 is established between the ID token B and the ID provider computer system 136, to be specific also via user computer system 100 and the network 116 with end-to-end encryption and also with the connection oriented protocol.

The ID provider computer system 136 reads via connection 101 at least a first attribute A from the ID token A or several of such attributes A identifying the user unambiguously. This can for example be the name, the birth date and the place of residence of the user.

The attributes A are digitally signed by ID provider computer system 136 and forwarded to the service computer system 150. Preferably this is performed in such a way that the ID provider computer system 136 does not retain after the attributes A have been sent together with the signature to the service computer system 150.

A similar approach is used for attribute B, which is stored in ID token B: The attribute B, e.g. the vehicle identification number, is read by the ID provider computer system 136 via connection 103 from ID token B, signed and forwarded to the service computer system 150. Preferably no copy is stored of attribute B by ID provider computer system 136 after sending it to the service computer system 150.

Service computer system 150 determines the updated license number of the vehicle, which is identified by attribute B by using the attributes A and B. For example the service computer system 150 determines this new license number with a database query in a database, where such license numbers are stored. The attribute A and/or B may be used for the database query.

The service computer system 150 sends data comprising the new license number of the vehicle to the ID provider computer system. Preferably the service computer system 150 signs the data such that the ID provider computer system 136 can check this signature in order to procure security with regard to the authenticity of the data.

The data with the new license number is sent to ID token B via connection 103 by ID provider computer system 136 such that the new license number is stored there. Additionally the ID provider computer system 136 can also write the updated user's address in this manner into ID token B. For this purpose it may be necessary that the ID provider computer system access again ID token A via connection 101 in order to read the attributes with the changed address.

For write access to ID token B by ID provider computer system 136 via connection 103 it is a necessary condition that connection 101 to ID token A exists. Thereby it is made sure that the anchor of trust still exists when the data, e.g. the new license number, is written into ID token B via connection 103.

Figure 2:
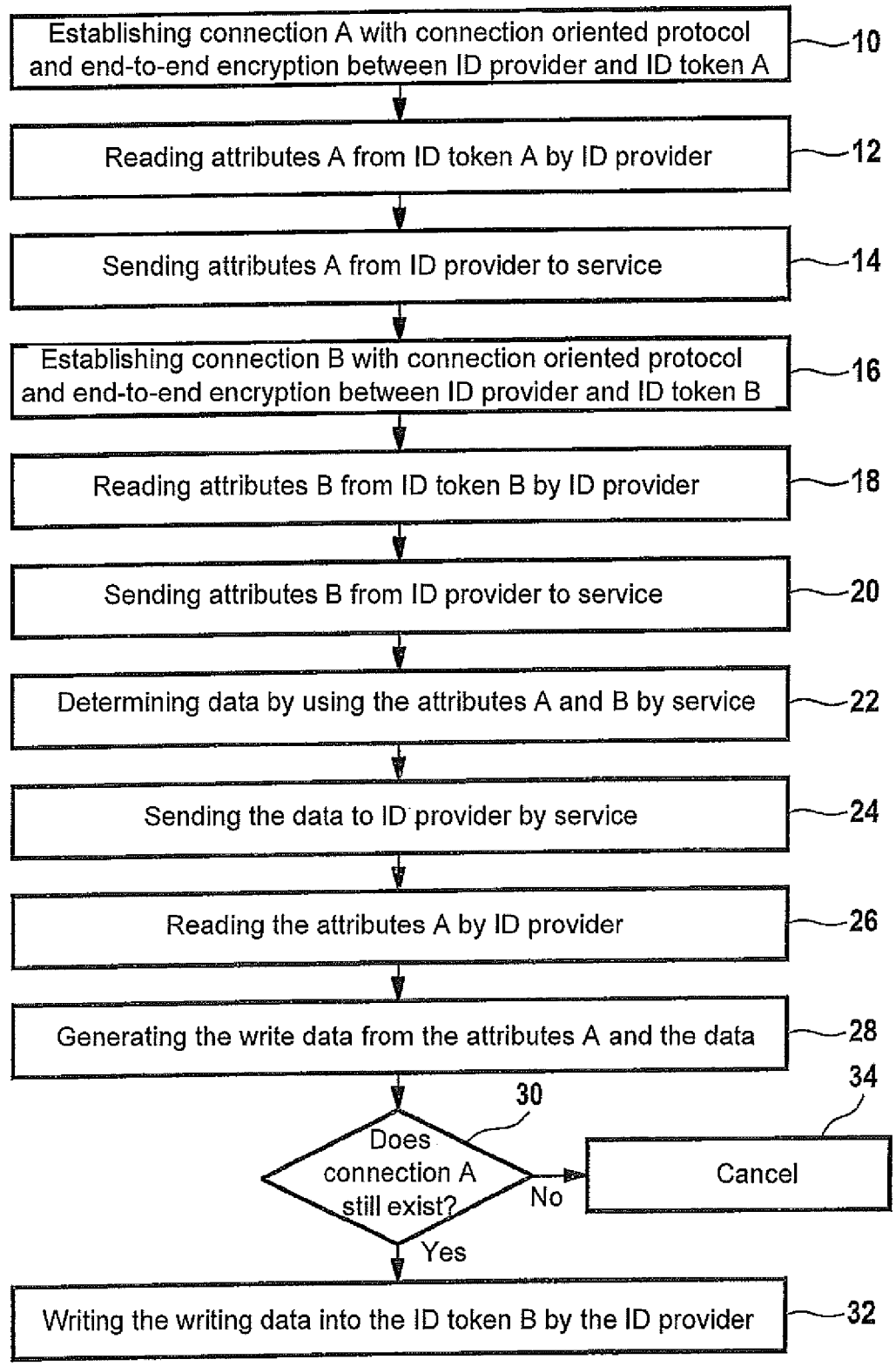
FIG. 2 shows a flowchart of an embodiment of a method according to the invention.

FIG. 2 shows a corresponding flow diagram.

In step 10 connection A is established between the ID provider and ID token A, and that with a connection oriented protocol and with end-to-end encryption. In step 12 the attributes A are read from ID token A by the ID provider, and that via connection A. The attributes A are then forwarded by the ID provider in step 14 to the service (cf. ID provider computer system 136 and service computer system 150 in the embodiment of FIG. 1).

Analogous steps 16, 18 and 20 are performed with regard to ID token B and the attributes B stored in ID token B, which are consequently also received by the service.

In step 22 the service determines with the aid of the attributes A and B the data to be used for updating the ID token B. The data can for example be the license number of the vehicle, to which the ID token B is assigned.

In step 24 this data are sent by the service to the ID provider. If the ID token B shall also be updated with the attributes A, these attributes A are read again in step 26 by the ID provider via connection A. In step 28 the ID provider generates writing data, i.e. a data set that comprises the data to be written into ID token B, from the attributes A and the data received from the service.

In step 30 the ID provider checks if connection A still exists. If so, the writing data is written and stored in step 32 by the ID provider via connection B in ID token B such that ID token B is updated. In the opposite case the ID provider cancels the procedure in step 34, because a secure writing of the writing data into ID token B is no possible due to the cancellation of connection A.

FIG. 3 shows a user computer system 100 of a user 102. The user computer system 100 has an interface 104 for communication with an ID token 106 which has an appropriate interface 108.

The user computer system 100 has at least one processor 110 for executing program instructions 112 and also a network interface 114 for communication via a network 116. The network may be a computer network, such as the Internet.

The ID token 106 has an electronic memory 118 with protected memory areas 120, 122 and 124. The protected memory area 120 is used for storing a reference value which is required for authenticating the user 102 to the ID token 106. Said reference value is an identifier, for example, particularly what is known as a personal identification number (PIN), or is reference data for a biometric feature of the user 102 which can be used for authenticating the user to the ID token 106.

The protected area 122 is used for storing a private key and the protected memory area 124 is used for storing attributes, for example of the user 102, such as his name, place of residence, date of birth, sex, and/or attributes which relate to the ID token itself, such as the institution which produced or issued the ID token, the validity period of the ID token, or an identifier for the ID token, such as a passport number or a credit card number.

The electronic memory 118 may also have a memory area 126 for storing a certificate. The certificate contains a public key which is associated with the private key stored in the protected memory area 122. The certificate may have been produced on the basis of a public key infrastructure (PKI) standard, for example on the basis of the X.509 standard.

The certificate does not necessarily have to be stored in the electronic memory 118 of the ID token 106. Alternatively or in addition, the certificate may also be stored in a public directory server.

The ID token 106 has a processor 128. The processor 128 is used for executing program instructions 130, 132 and 134. The program instructions 130 are used for user authentication, i.e. for authenticating the user 102 to the ID token.

In an embodiment using PINs, the user 102 inputs his PIN, in order to authenticate himself, into the ID token 106, for example via the user computer system 100. Execution of the program instructions 130 then accesses the protected memory area 120 in order to compare the input PIN with the reference value stored therein for the PIN. If the input PIN matches the reference value of the PIN, the user 102 is deemed to have been authenticated.

Alternatively, a biometric feature of the user 102 is captured. By way of example, the ID token 106 has a fingerprint sensor for this purpose, or a fingerprint sensor is connected to the user computer system 100. The biometric data captured from the user 102 are compared with the biometric reference data stored in the protected memory area 120 by executing the program instructions 130 in this embodiment. If there is a sufficient match between the biometric data captured from the user 102 and the biometric reference data then the user 102 is deemed to have been authenticated.

The program instructions 134 are used for executing the steps of a cryptographic protocol which relate to the ID token 106 in order to authenticate an ID provider computer system 136 to the ID token 106. The cryptographic protocol may be a challenge/response protocol based on a symmetric key or an asymmetric key pair.

By way of example, the cryptographic protocol implements an extended access control method, as is specified for machine-readable travel documents (MRTDs) by the international aviation authority (ICAO). Successful execution of the cryptographic protocol authenticates the ID provider computer system 136 to the ID token, thus proving its read authorization for reading the attributes stored in the protected memory area 124. The authentication may also be reciprocal, i.e. the ID token 106 then also needs to authenticate itself to the ID provider computer system 136 on the basis of the same or a different cryptographic protocol.

The program instructions 132 are used for the end-to-end encryption of data transmitted between the ID token 106 and the ID provider computer system 136, but at least of the attributes read by the ID provider computer system 136 from the protected memory area 124. For the end-to-end encryption, it is possible to use a symmetric key which is agreed between the ID token 106 and the ID provider computer system 136 when the cryptographic protocol is executed, for example.

The program instructions 131 are used for performing the connection oriented protocol on the part of the ID token 106. For example the connection oriented protocol can be TCP. Herein a "connection oriented protocol" is every protocol for establishing a virtual channel between two end points, here between one of the ID tokens and the ID provider computer system 136. Transmission can be performed on this channel in both directions. As an example a proprietary protocol and a standardized protocol are used for this purpose, e.g. TCP; TCP is located in layer 4 of the OSI Reference Model and can be set up onto the internet protocol.

As an alternative to the embodiment shown in FIG. 3, the user computer system 100 can use its interface 104 to communicate with the interface 108 not directly but rather via a reader, connected to the interface 104, for the ID token 106. This reader, for example what is known as a class 2 chip card terminal, can also be used to input the PIN.

The interface 104 and the reader, if applicable, are adapted to keep up the connections 101 and 103 (cf. FIG. 1) at the same time. For example two slots for the ID tokens A and B are located in the reader or communication at the same time with the ID tokens A and B is possible via an RF channel.

The ID token B 107 is composed principally in a similar way as ID token 106 in the embodiment considered here. For describing the single components of ID token B 107 is pointed to the above description of the components of ID token A 106. In contrast to ID token A a write access to the protected storage portion 124' via connection B can be performed for updating the attribute values, which are stored there, with the write data. An exception of this is the attribute value with the unique identifier, i.e. the vehicle identification number, which is unchangeable.

Program instructions 130' may be dispensable if no user authentication is provided for ID token 107.

The ID provider computer system 136 has a network interface 138 for communication via the network 116. The ID provider computer system 136 also has a memory 140 which stores a private key 142 for the ID provider computer system 136 and also the appropriate certificate 144. This certificate may also be a certificate based on a PKI standard, for example, such as X.509.

The ID provider computer system 136 also has at least one processor 145 for executing program instructions 146 and 148. By executing the program instructions 146, the steps of the cryptographic protocol which relate to the ID provider computer system 136 are executed. Overall, the cryptographic protocol is thus implemented through execution of the program instructions 134 by the processor 128 of the ID token 106 and of the ID token 107 respectively and also through execution of the program instructions 146 by the processor 145 of the ID provider computer system 136.

The program instructions 148 are used to implement the end-to-end encryption on the ID provider computer system 136, for example on the basis of the symmetric key which has been agreed between the ID token 106 and the ID provider computer system 136 when the cryptographic protocol is executed. In principle, it is possible to use any method for agreeing the symmetric key for the end-to-end encryption which is known per se beforehand, such as a Diffie-Hellman key exchange.

The program instructions 147 are used to implement the connection oriented protocol, and that in such a way that both connections 101 and 103 can be kept up at the same time.

The program instructions 151 are used to implement a control program for the flow control.

The ID provider computer system 136 is preferably situated in a particularly protected environment, particularly in what is known as a trust center, so that the ID provider computer system 136 forms the confidence anchor for the authenticity of the attributes read from the ID token 106 in combination with the need for authentication of the user 102 to the ID token 106.

The service computer system 150 may be designed to take a service order for initialization, in particular for updating the ID token B.

To this end, the service computer system 150 has a network interface 152 for connection to the network 116. In addition, the service computer system 150 has at least one processor 154 for executing program instructions 156. Execution of the program instructions 156 generates dynamic HTML pages, for example, which the user 102 can use to input his service order.

Depending on the nature of the service order, the service computer system 150 needs to receive one or more attributes of ID token 106 and ID token 107 from ID provider computer system 136 in order to execute the service order.

To use the service provided by the service computer system 150, the procedure is as follows:

1. Authentication of the user 102 to the ID token 106.

The user 102 authenticates himself to the ID token 106. In an implementation using PINs, the user 102 does this by inputting his PIN, for example using the user computer system 100 or a chip card terminal connected thereto. By executing the program instructions 130, the ID token 106 then checks the correctness of the input PIN. If the input PIN matches the PIN's reference value stored in the protected memory area 120, the user 102 is deemed to have been authenticated. The procedure may be similar if a biometric feature of the user 102 is used to authenticate him, as described above.

2. Authentication of the ID provider computer system 136 to the ID token 106.

To this end, the connection 101 is set up between the ID token 106 and the ID provider computer system 136 via the user computer system 100 and the network 116. By way of example, the ID provider computer system 136 transmits its certificate 144 via this connection to the ID token 106. The program instructions 134 then generate what is known as a challenge, i.e. a random number, for example. This random number is encrypted using the public key of the ID provider computer system 136, which is contained in the certificate 144. The resulting cipher is sent from the ID token 106 via the connection to the ID provider computer system 136. The ID provider computer system 136 decrypts the cipher using its private key 142 and in this way obtains the random number. The random number is returned by the ID provider computer system 136 to the ID token 106 via the connection. By executing the program instructions 134, said ID token checks whether the random number received from the ID provider computer system 136 matches the originally generated random number, i.e. the challenge. If this is the case, the ID provider computer system 136 is deemed to have been authenticated to the ID token 106. The random number can be used as a symmetric key for the end-to-end encryption.

3. When the user 102 has successfully authenticated himself to the ID token 106, and when the ID provider computer system 136 has successfully authenticated itself to the ID token 106, the ID provider computer system 136 is provided with read authorization for reading an attribute, a plurality of attributes or all of the attributes A stored in the protected memory area 124. On the basis of a relevant read command which the ID provider computer system 136 sends to the ID token 106 via the connection, the requested attributes A are read from the protected memory area 124 and they are encrypted by executing the program instructions 132. The encrypted attributes A are transmitted via the connection to the ID provider computer system 136, where they are decrypted by executing the program instructions 148. This provides the ID provider computer system 136 with knowledge of the attributes read from the ID token 106.

These attributes A are signed by the ID provider computer system using its certificate 144 and are transmitted via the user computer system 100 or directly to the service computer system 150. This notifies the service computer system 150 of the attributes A read from the ID token 106. The need to authenticate the user 102 to the ID token 106 and to authenticate the ID provider computer system 136 to the ID token 106 provides the necessary confidence anchor, so that the service computer system 150 can be certain that the attributes of the user 102 which have been communicated to it by the ID provider computer system 136 are correct and not falsified.

4. An analogous approach is used for transmitting at least one attribute B to the service computer system 150, i.e. the above mentioned steps 1 through 3 are performed with regard to ID token 107. For this purpose connection 103 is established. As a result the service computer system 150 has then received the attributes A and B in a safe and trustworthy way. The authentication of the user to the ID token B can be omitted contrary to steps 1 through 3.

5. The service computer system then determines with the aid of attributes A and B the data, which shall be used for updating or initializing for example of an attribute stored in the protected portion 124' of ID token B. For example if the ID token B is assigned to a motor vehicle 172 and the service computer system 150 is an online government agency for registering motor vehicles, the service computer system can determine the license number of the motor vehicle 172 by accessing a database 174 with the aid of attributes A and/or B, which is connected to the service computer system 150. This can be performed such that a database query to database 174 is performed by executing program instructions 156 with the aid of attributes A and/or B in order to retrieve the license number stored there. The service computer system signs the data, which comprises the up to date license number, with its private key and sends the signed data via the network 116 to the ID provider computer system 136. The ID provider computer system 136 checks the validity of the signature. If the signature is valid, the control program 151 checks whether both connections 101 and 103 still exist. If so, the control program 151 writes then the data received by the service computer system 150 via connection 103 into the ID token B, for example for updating the attribute value of the license number, which is stored in the protected storage portion 124'.

Depending on the embodiment, the order of the authentication may be different. By way of example, provision may be made for the user 102 to have to authenticate himself to the ID token 106 first of all, followed by the ID provider computer system 136. In principle, however, it is also possible for the ID provider computer system 136 to have to authenticate itself to the ID token 106 first of all, followed only then by the user 102. This applies accordingly to the ID token 107.

In the first case, the ID token 106 and ID token 107 respectively is designed, by way of example, such that it is unlocked only through input of a correct PIN or a correct biometric feature by the user 102. Only this unlocking allows the program instructions 132 and 134 to start and hence the ID provider computer system 136 to be authenticated.

In the second case, it is also possible to start the program instructions 132 and 134 even when the user 102 has not authenticated himself to the ID token 106. In this case, by way of example, the program instructions 134 are in a form such that the ID provider computer system 136 cannot perform read access to the protected memory area 124 for the purpose of reading one or more of the attributes until after the program instructions 130 have signaled that the user 102 has also been successfully authenticated. The same applies accordingly to the ID token 107.

Of particular advantage is the utilization of the ID tokens 106 and 107 for e-government applications, for example, specifically without media disruption and legally on the basis of the confidence anchor formed by the need for the user 102 and the ID provider computer system 136 to be authenticated to the ID token 106. Of particular advantage is also the fact that central storage of the attributes of various users 102 is not necessary, which means that the data protection problems which exist in the prior art are solved hereby. As far as the convenience of the application of the method is concerned, it is of particular advantage that prior registration of the user 102 in order to use the ID provider computer system 136 is not necessary.

FIG. 4 shows an embodiment of a method according to the invention. In step 200, a service request is sent from the user computer system to the service computer system. By way of example, the user does this by starting an Internet browser on the user computer system and inputting a URL to call a web page on the service computer system. The user then inputs his service request into the called web page, for example in order to update his ID token B.

For this update it is necessary that a connection A and a connection B respectively is established between the ID token A and the ID provider as well as between the ID token B and the ID provider. Via this connection the ID provider can read attributes from the ID tokens A and B. In the embodiment considered here establishing the connections A and B is performed sequentially, wherein for example at first the connection A is established. For this purpose the currently used ID token is set equal to the ID token A in step 201.

In step 202, the service computer system 150 then specifies one or more attributes which it requires in order to check the user's authorization for the service request. In particular, the service computer system can specify attributes which determine the digital identity of the user 102. This specification of the attributes by the service computer system 150 may be firmly prescribed or can be determined individually by the service computer system 150 using prescribed rules, depending on the service request.

In step 204, the attribute specification, i.e. the specification performed in step 202 for the one or more attributes, is transmitted from the service computer system to the ID provider computer system, specifically either directly or via the user computer system.

In order to provide the ID provider computer system with the opportunity to read attributes from his ID token, the user authenticates himself to the ID token in step 206.

In step 208, a connection is set up between the ID token and the ID provider computer system. This is preferably a protected connection, for example on the basis of what is known as a secure messaging method.

In step 210, the ID provider computer system is at least authenticated to the ID token via the connection which has been set up in step 208. In addition, there may also be provision for the ID token to be authenticated to the ID provider computer system.

When both the user and the ID provider computer system have been successfully authenticated to the ID token, the ID provider computer system is provided with the access authorization for reading the attributes by the ID token. In step 212, the ID provider computer system sends one or more read commands for reading the attributes required according to the attribute specification from the ID token. The attributes are then transmitted using end-to-end encryption via the protected connection to the ID provider computer system, where they are decrypted.

The attribute values which have been read are signed by the ID provider computer system in step 214. In step 216, the ID provider computer system sends the signed attribute values via the network. The signed attribute values reach the service computer system either directly or via the user computer system. In the latter case, the user may have the opportunity to take note of the signed attribute values and/or to add further data to them. Provision may be made for the signed attribute values, possibly with the added data, to be forwarded from the user computer system to the service computer system only following release by the user. This provides the greatest possible transparency for the user in terms of the attributes sent from the ID provider computer system to the service computer system.

Thereafter, in step 218 the currently processed ID token is set equal to ID token B and the flow control steps back to step 202. Alternatively, a step back to step 206 may be performed, if the service computer system specified in step 202 also the attributes B to be read from the ID token B, and if this specification has already been transmitted to the ID provider and stored there in step 204. Preferably such an intermediate storing is omitted in order to be able to adapt the ID provider stateless.

Step 206 can be omitted with regard to ID token B.

After the repeated performance of steps 202 through 216 with regard to the ID token B the service computer system has received the attributes A and B.

In step 220 the service computer system sends a release signal for writing the data into the ID token B to the ID provider. In response to this the ID provider reads in step 224 the data determined by the computer system in step 220. For this purpose the ID provider computer system accesses for example via the network the service computer system. Subsequently the ID provider computer system writes the data in step 2226 into ID token B via connection B, and that under the condition that also connection A still exists.

FIG. 5 shows a further embodiment of a method according to the invention. A user input from a user 102 into a user computer system 100 is used by the user 102 to specify a service on a service computer system which he or she wishes to use. By way of example, this is done by calling an Internet page on the service computer system and selecting one of the services provided thereon. The service request from the user 102 is transmitted from the user computer system 100 to the service computer system 150.

For example the service computer system comprises a web service 176, in particular a web services architecture specified by W3C. The web service 176 is used as an interface of the service computer system 150 towards the user computer system 100 and/or the ID provider computer system 136.

The service computer system 150 responds to the service request with an attribute specification of the attributes A, i.e. for example a list of attribute names. When the attribute specification has been received, the user computer system 100 asks the user 102 to authenticate himself to the ID token 106, for example by means of an input request.

The user 102 then authenticates himself to the ID token 106, for example by inputting his PIN. Following successful authentication, the attribute specification is forwarded from the user computer system 100 to an ID provider computer system 136. For this purpose the connection A is established. The Id provider computer system 136 then authenticates itself to the ID token 106 and sends a read request for reading the attributes according to the attribute specification to the ID token 106.

Assuming the prior successful authentication of the user 102 and of the ID provider computer system 136, the ID token 106 responds to the read request with the desired attributes A. The ID provider computer system 136 signs the attributes and sends the signed attributes to the user computer system 100. Following release by the user 102, the signed attributes are then transmitted to the service computer system 150, which can then provide the desired service as appropriate.

The part sequence 178 labeled in figure with the steps for transmitting the attributes A to the web service 176 is subsequently performed again, and that with regard to ID token B in order to transmit also the attributes B to the web service 176 according to the attribute specification. Here, the steps for authentication of the user to the ID token B can be omitted.

The part sequence 178' intended for this purpose can be performed for example in the following way:

The service computer system 150 responds to receiving the attributes A with an attribute specification of the attributes B, i.e. for example a list of attribute names. The attribute specification is then forwarded to the ID provider computer system 136 by the user computer system 100. For this purpose the connection B is established. The ID provider computer system 136 authenticates subsequently to the ID token 107 and sends a read request for reading the attributes according to the attribute specification to the ID token 107.

Assuming the prior successful authentication of the user 102 and of the ID provider computer system 136, the ID token 107 responds to the read request with the desired attributes B. The ID provider computer system 136 signs the attributes B and sends the signed attributes to the user computer system 100. Following release by the user 102, the signed attributes are then transmitted to the service computer system 150.

The web service 176 then forwards the attributes A and B to a component 180 of the service computer system 150, which is used as attribute provider, i.e. for determining the updated or initial attribute value for writing into the ID token B.

For this purpose the component 180 can perform a database query to the database 174 by using the attributes A and/or B. The database entries identified by the database query in the database 174, which comprise the data to be written into the ID token B, can be marked by the component 180 with a so-called flag. Thereafter the database 174 or the component 180 signals the web service 176 that the data is provided. This signal is forwarded by the web service 176 to the ID provider computer system 136. The ID provider computer system 136 then reads the data via web service 176 from the data base 174 and writes the data then into the ID token B under the condition that both connections A and B exist until the writing process finishes.

For securing the data provided by the component 180 against unauthorized access a key may be generated by the component 180, which is transmitted together with the signal "data ready" to the ID provider computer system 136. The subsequent reading of the data by the ID provider computer system is only possible if the ID provider computer system has this key. For example the ID provider computer system 136 has to authenticate itself to the web service with this key in order to have access to the data.

Alternatively or additionally providing the data by the component 180 can be performed for a limited time period only. For this purpose the component starts a timer after the data has been provided or after the signal "data ready" has been sent to the ID provider computer system 136. Reading the data by the ID provider computer system 136 is only possible if this is performed before the timer has expired.

Figure 6:
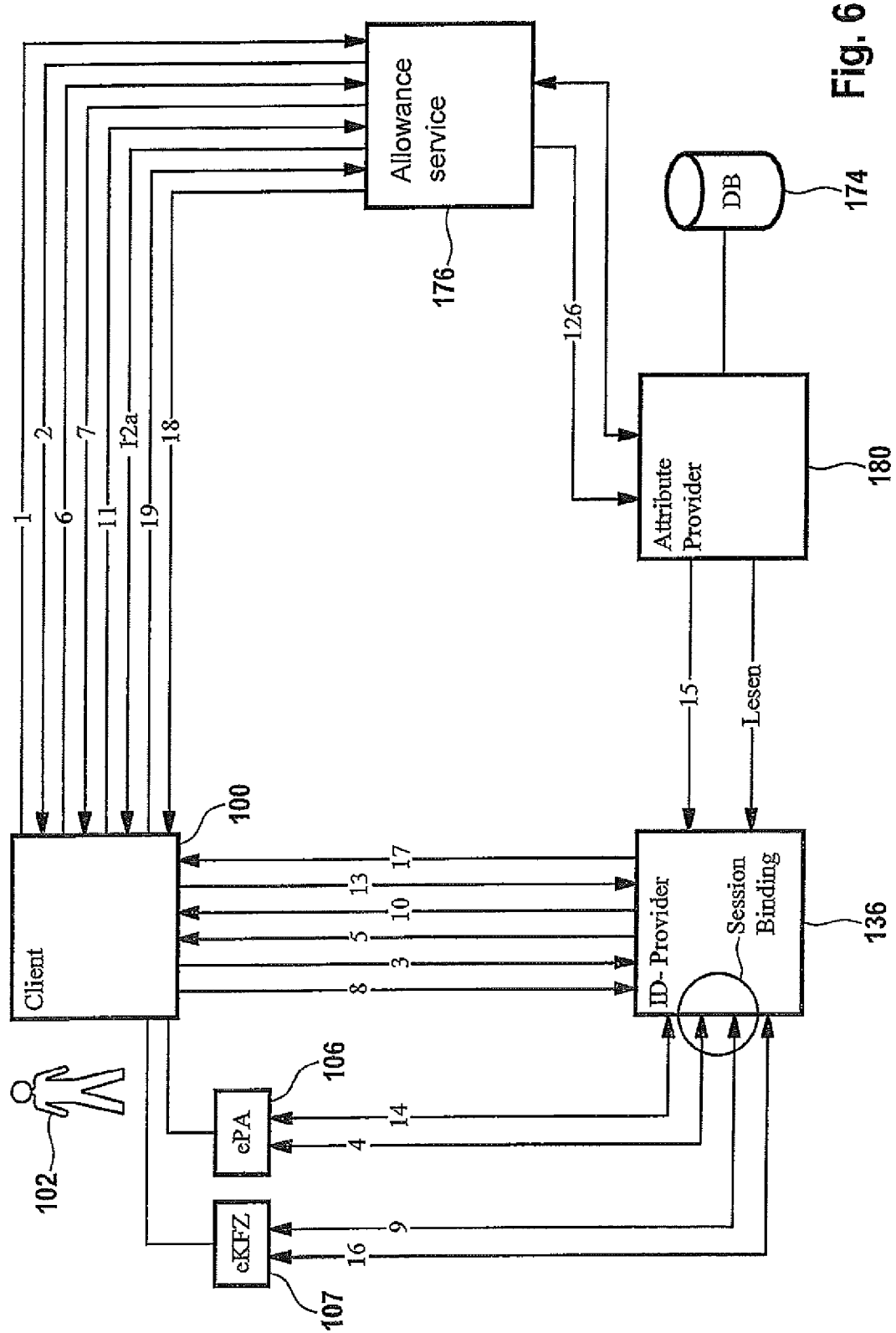
FIG. 6 shows a block diagram of a further embodiment of computer systems and ID tokens according to the invention.

In the embodiment of FIG. 6 the user computer system 100 is designed as client computer. The ID token A 106 is an electronic passport "ePA". The ID token B 107 is an electronic motor vehicle document, for example an electronic motor vehicle registration certificate or an electronic motor vehicle certificate of title "eKFZ". The web service 176 is constructed herein as an allowance service, i.e. the web service provides various services for the online registration or registration transfer of motor vehicles. The web service 176 and the attribute provider 180 can be connected with a connection for reading and/or writing data.

For updating the ID token 107, for example with a new license number, the following steps are performed:

1. The user retrieves a service provided by the web service 176 from his user computer system 100 by using a service request.
2. The web service 176 responds to this service request with an authentication request, i.e. the web service 176 specifies those attributes A by using the attribute specification A, which it needs with regard to the user 102. This authentication request is sent from the web service 176 to the user computer system 100. Further the web service 176 sends an information to the user computer system 100, which indicates a multi document session, i.e. a session where two parallel connections to the ID tokens 106 and 107 shall be established.
3. A request for confirming the user ID is sent from the user computer system 100 to the ID provider 136. This request comprises the attribute specification A, i.e. a specification of the attributes A, which shall be read from the ID token 106. Further the information, that the connection A to be established with the ID token 106 shall be kept up after reading the attributes from the ID token 106, is sent from the user computer system 100 to the ID provider computer system 136.
4. The connection A is then established between the ID provider computer system 136 and the ID token 106 and the ID provider computer system 136 reads the attributes from the ID token A. After having read the attributes A the connection A, i.e. the session, is kept up.
5. The ID provider computer system 136 sends the attributes A to the user computer system 100 in response to the request of step 3.
6. The user computer system 100 sends the attributes A to the web service 176 in response to the authentication request of step 2.
7. The web service 176 send an authentication request regarding attributes B to the user computer system 100, i.e. regarding such attributes B that are stored in the ID token 107. Hence, the authentication request comprises an attribute specification of the attributes B. Further information is transmitted that the multi document session shall be extended, i.e. that a further connection B shall be established.
8. The user computer system 100 sends a request for a motor vehicle ID confirmation to the ID provider computer system 136, i.e. a request for providing the attributes B as specified by the attribute specification B received in step 7 with the authentication request.
9. The ID provider computer system 136 establishes the connection B to the ID token 107 and reads via this connection the attributes B. After reading the attributes B the connection B is kept up. For example a so-called session binding is performed for the connections A and B.
10. The ID provider computer system 136 sends the attributes B to the user computer system 100 as response to the request of step 8.
11. The user computer system 100 sends the attributes B to the web service 176 as response to the authentication request of step 7.
12a. The web service 176 sends a release signal to the user computer system 100 for writing data into the ID token 107, as for example data of the updated license number.

12b. The web service 176 sends a release signal for reading the data to be written into the ID token 107 by the attribute provider 180.
13. The user computer system 100 sends a request for writing the ID token 107 to the ID provider computer system 136 because of the release signal received in step 12.
14. The ID provider computer system 136 reads again the attributes A from the ID token 106 over the connection A, because these have not been stored in the ID provider computer system 136 after the first reading process.
15. The ID provider computer system 136 reads the data to be written into the ID token 107 from the attribute provider 180. This is possible because the attribute provider has received the release signal for reading in step 12b.
16. The ID provider computer system 136 generates from the attributes A and the data read from the attribute provider 180 a data set for writing into the ID token 107 and writes this data set via connection B into the ID token 107.
17. The ID provider computer system 136 sends a confirmation to the user computer system 100, and that as confirmation for the request received in step 13.
18. The user computer system 100 sends a confirmation regarding the release signal of step 12a to the web service 176.
19. The web service 176 sends a confirmation regarding the service request of step 1 to the user computer system 100 in order to confirm the successful update of the ID token 107.

Especially advantageous is here that the ID provider computer system 136 is used as intermediary between the different data sources, which belong to different administrative sovereignty. Further it is especially advantageous that the ID provider computer system 136 forms the point of confidence for the binding of the different sessions.

LIST OF REFERENCE SYMBOLS

100 User computer system
101 Connection A
102 User
103 Connection B
104 Interface
106 ID token
107 ID token
108 Interface
110 Processor
112 Program instructions
114 Network interface
116 Network
118 Electronic memory
120 Protected memory area
122 Protected memory area
124 Protected memory area
126 Memory area
128 Processor
130 Program instructions
131 Program instructions
132 Program instructions
134 Program instructions
136 ID provider computer system
138 Network interface
140 Memory
142 Private key
144 Certificate
145 Processor
146 Program instructions
147 Program instructions
148 Program instructions
149 Program instructions
150 Service computer system
151 Program instructions
152 Network interface
154 Processor
156 Program instructions
158 Configuration data record
160 Configuration data record
161 Configuration data record
162 User input
166 Attribute specification
168 Request
170 Response
172 Motor vehicle
174 Database
176 Web service
178 Part sequence
180 Component

The invention claimed is:
1. A method for storing data, having the following steps:
establishing a first connection between a first ID token and a first computer system via a second computer system for reading at least one first attribute from the first ID token, wherein the first connection includes a local connection between the first ID token and the second computer system and a wide area network connection between the second computer system and the first computer system,
establishing a second connection between a second ID token and the first computer system via the second computer system for reading at least one second attribute from the second ID token, wherein the second connection includes a local connection between the second ID token and the second computer system and the wide area network connection between the second computer system and the first computer system,
sending the first and the second attributes from the first computer system to a third computer system over a further wide area network connection between the first computer system and the third computer system,
receiving the data from the third computer system by the first computer system over the further wide area network connection and storing the data in the first computer system, and
writing the data into the second ID token via the second connection by the first computer system in order to store the data in the second ID token, wherein a condition for writing the data is that the first connection also still exists,
wherein the first and the second connection are respectively connections with end-to-end encryption and a connection oriented protocol,
wherein the following steps are performed for establishing each of the first and the second connections: (i) a user is authenticated to the respective first and second ID tokens, and (ii) the first computer system is authenticated to the respective first and second ID tokens,
wherein following successful authentication of the user and the first computer system to the respective first and second ID tokens a read access to at least one of the first and second attribute stored in the respective first and second ID tokens is performed by the first computer system for transmission, signed by the first computer system, and transmitted to the third computer system, and wherein the read access by the first computer system to at least one of: the first ID token and the second ID token is effected in order to read the first and second attributes of the respective first and second ID tokens specified in an attribute specification.

2. The method according to claim 1, wherein at least one of the first and the second ID token is a document of value or security.

3. The method according to claim 1, wherein the connection oriented protocol is TCP.

4. The method as claimed in claim 1, wherein the first computer system is authenticated to the respective first and second ID tokens using a certificate of the first computer system, wherein the certificate contains an indication of those attributes stored in the respective first and second ID tokens for which the first computer system is authorized for the read access.

5. The method as claimed in claim 4, wherein the respective first and second ID tokens check the read authorization of the first computer system for the read access to the at least one of the first and second attribute using the certificate.

6. The method as claimed in claim 4, wherein the certificate comprises a specification of the write rights of the first computer system for writing the data into the second ID token, wherein the second ID token checks the write authorization of the first computer system for the write access to write the data using the certificate.

7. The method as claimed in claim 1, having the following further steps:
at least one of the at least one first attribute read from the first ID token, and the at least one second attribute read from the second ID token, is signed by the first computer system, and the signed attribute is transmitted from the first computer system to the third computer system.

8. The method as claimed in claim 1, having the following further steps:
a service request is sent from the second computer system to the third computer system,
one or more attributes are specified by the third computer system, and
the attribute specification of the first and second attributes is sent from the third computer system to the first computer system.

9. The method as claimed in claim 8, wherein the service request contains an identifier for identification of the first computer system to the third computer system and for obtaining the data from the third computer system by the first computer system.

10. The method as claimed in claim 1, wherein the at least first and respectively second attribute read from the respective ID token is sent to the second computer system, from where it is forwarded to the first computer system following release by the user.

11. The method as claimed in claim 10, wherein the user can add further data to the attributes before they are forwarded to the third computer system.

12. The method as claimed in claim 1, wherein the first computer system accesses the first ID token via the first connection before writing the data in order to read the first attribute again, and wherein the first computer system generates writing data from the first attribute and the data received by the third computer system, which are then written into the second ID token by the first computer system.

13. The method as claimed in claim 1, wherein the first ID token is assigned to a user and wherein the second ID token is assigned to a motor vehicle, wherein the second attribute defines the motor vehicle non-ambiguously.

14. A computer-readable, non-transitory storage medium, containing a computer program product having instructions which can be executed by a computer system for the purpose of performing a method, the method including the steps of:
establishing a first connection between a first ID token and a first computer system via a second computer system for reading at least one first attribute from the first ID token, wherein the first connection includes a local connection between the first ID token and the second computer system and a wide area network connection between the second computer system and the first computer system,
establishing a second connection between a second ID token and the first computer system via the second computer system for reading at least one second attribute from the second ID token, wherein the second connection includes a local connection between the second ID token and the second computer system and the wide area network connection between the second computer system and the first computer system,
sending the first and the second attributes from the first computer system to a third computer system over a further wide area network connection between the first computer system and the third computer system,
receiving the data from the third computer system by the first computer system over the further wide area network connection and storing the data in the first computer system, and
writing the data into the second ID token via the second connection by the first computer system in order to store the data in the second ID token, wherein a condition for writing the data is that the first connection also still exists,
wherein the first and the second connection are respectively connections with end-to-end encryption and a connection oriented protocol,
wherein the following steps are performed for establishing each of the first and the second connections: (i) a user is authenticated to the respective first and second ID tokens, and (ii) the first computer system is authenticated to the respective first and second ID tokens,
wherein following successful authentication of the user and the first computer system to the respective first and second ID tokens a read access to at least one of the first and second attribute stored in the respective first and second ID tokens is performed by the first computer system for transmission, signed by the first computer system, and transmitted to the third computer system, and
wherein the read access by the first computer system to at least one of: the first ID token and the second ID token is effected in order to read the first and second attributes of the respective first and second ID tokens specified in an attribute specification.

15. A computer system having
means for establishing a first connection between a first ID token via a second computer system for reading at least one first attribute from the first ID token, wherein the first connection includes a local connection between the first ID token and the second computer system and a wide area network connection between the second computer system and the first computer system, means for establishing a second connection between a second ID token via the second computer system for reading at least one second attribute from the second ID token, wherein the second connection includes a local connection between the second ID token and the second computer system and the wide area network connection between the second computer system and the first computer system, means for sending the first and the second attributes from the first computer system to a third computer system over a further wide area network connection between the first computer system and the third computer system, means for receiving the data from the third computer system over the further wide area network connection and storing the data in the first computer system, means for writing the data from the first computer system into the second ID token via the second connection in order to store the data in the second ID token, wherein a condition for writing the data is that also the first connection still exists, means for receiving an attribute specification via a network, wherein the attribute specification specifies at least a first and/or a second attribute, and means for authenticating to the first and the second ID token, wherein a prerequisite for the reading of the first and respectively the second attribute is that a user authenticated himself at least to the first ID token and that the computer system authenticated itself to the first and to the second ID token, wherein the first and the second connections are each connections with end-to-end encryption and with a connection oriented protocol, and wherein following successful authentication of the user and the first computer system to the respective first and second ID tokens a read access to at least one of the first and second attribute stored in the respective first and second ID tokens is performed by the first computer system for transmission, signed by the first computer system, and transmitted to the third computer system.

16. The computer system as claimed in claim 15, wherein the means for establishing the first and the second connections are adapted to keep up the first and the second connections at the same time.

* * * * *